United States Patent
Park

(10) Patent No.: US 9,866,142 B2
(45) Date of Patent: Jan. 9, 2018

(54) SINGLE-PHASE PHOTOVOLTAIC INVERTER

(71) Applicant: LSIS CO., LTD., Anyang-si, Gyeonggi-do (KR)

(72) Inventor: Tae Bum Park, Seoul (KR)

(73) Assignee: LSIS CO., LTD., Anyang-si (KR)

(*) Notice: Subject to any disclaimer, the term of this patent is extended or adjusted under 35 U.S.C. 154(b) by 107 days.

(21) Appl. No.: 14/874,245

(22) Filed: Oct. 2, 2015

(65) Prior Publication Data

US 2016/0111974 A1 Apr. 21, 2016

(30) Foreign Application Priority Data

Oct. 15, 2014 (KR) .................. 10-2014-0139264

(51) Int. Cl.
*H02M 7/44* (2006.01)
*H02M 7/219* (2006.01)
(Continued)

(52) U.S. Cl.
CPC .............. *H02M 7/44* (2013.01); *H02J 3/383* (2013.01); *H02M 7/219* (2013.01);
(Continued)

(58) Field of Classification Search
CPC .......... H02M 7/219; H02M 7/42; H02M 7/44; H02M 7/48; H02M 7/4826; H02M 7/53;
(Continued)

(56) References Cited

U.S. PATENT DOCUMENTS 6,282,104 B1* 8/2001 Kern .................. H02M 1/12
363/34
2013/0141133 A1 6/2013 Kratochvil et al.

FOREIGN PATENT DOCUMENTS

CN 102012475 4/2011
CN 102136736 7/2011
(Continued)

OTHER PUBLICATIONS

English translation of JP 2008178158.*
(Continued)

*Primary Examiner* — Timothy J Dole
*Assistant Examiner* — Carlos Rivera-Perez
(74) *Attorney, Agent, or Firm* — Lee, Hong, Degerman, Kang & Waimey PC

(57) ABSTRACT

Disclosed are a single-phase photovoltaic inverter and a control method thereof in which a small insulated transformer and an ordinary current transformer are used to measure a leakage current instead of a high-priced current transformer that is only used to measure a leakage current. The single-phase photovoltaic inverter that converts DC electric power supplied from a single-phase photovoltaic module into AC electric power includes an input terminal including a first input terminal connecting to a positive polarity of the single-phase photovoltaic module and a second input terminal connecting to a negative polarity of the single-phase photovoltaic module, an inverter unit configured to convert DC electric power supplied through the input terminal into AC electric power and supply the converted AC electric power to a grid, and a leakage current measuring unit connected in parallel with the inverter unit and configured to measure a leakage current delivered through the input terminal.

3 Claims, 1 Drawing Sheet

(51) Int. Cl.
*H02J 3/38* (2006.01)
*H02M 1/00* (2006.01)
*H02M 1/12* (2006.01)
*H02M 3/155* (2006.01)

(52) U.S. Cl.
CPC ............ *H02M 2001/007* (2013.01); *H02M 2001/0009* (2013.01); *H02M 2001/123* (2013.01); *H02M 2003/1552* (2013.01); *Y02E 10/56* (2013.01)

(58) Field of Classification Search
CPC .... H02M 7/537; H02M 7/5387; H02M 7/539; H02M 7/5395; H02M 2001/009; H02M 2001/007; H02M 2001/123; H02M 2001/0067; H02M 2003/1552; H02M 2003/00; H02M 2003/02; H02M 2003/10; H02M 2003/145; H02M 2003/155; H02M 2003/156; H02J 3/383; H02H 3/32; H02H 3/33; H02H 3/332; H02H 3/338; Y02E 10/56
USPC ... 363/34, 35, 37–48, 50–58, 63, 65, 74, 79, 363/89, 95–99, 131–134; 323/205–211, 323/222–226, 266, 271–278, 282–288, 323/299–303, 351, 906; 361/18, 42–50; 324/500, 509, 525, 761.01
See application file for complete search history.

(56) References Cited

FOREIGN PATENT DOCUMENTS

| | | |
|---|---|---|
| CN | 103003707 | 3/2013 |
| JP | 2002233045 | 8/2002 |
| JP | 2006170677 | 6/2006 |
| JP | 2008-178158 | 7/2008 |
| JP | 2008178158 | 7/2008 |
| JP | 2014517667 | 7/2014 |
| KR | 10-1223026 | 1/2013 |

OTHER PUBLICATIONS

Japan Patent Office Application Serial No. 2015-202835, Office Action dated Oct. 11, 2016, 4 pages.
European Patent Office Application Serial No. 15188906.0, Search Report dated Feb. 26, 2016, 9 pages.
State Intellectual Property Office of the People's Republic of China Application Serial No. 201510824014.X, Office Action dated Jul. 31, 2017, 7 pages.

* cited by examiner

SINGLE-PHASE PHOTOVOLTAIC INVERTER

CROSS-REFERENCE TO RELATED APPLICATION

Pursuant to 35 U.S.C. §119(a), this application claims the benefit of earlier filing date and right of priority to Korean Application No. 10-2014-0139264, filed on Oct. 15, 2014, the contents of which is incorporated by reference herein in its entirety.

BACKGROUND OF THE INVENTION

1. Field of the Invention

The present invention relates to a single-phase photovoltaic inverter and a control method thereof, and more particularly, to a single-phase photovoltaic inverter and a control method thereof in which a small insulated transformer and an ordinary current transformer are used to measure a leakage current instead of a high-priced specific current transformer that is only used to measure a leakage current.

2. Background of the Invention

In general, a single-phase photovoltaic inverter (or a grid tied inverter) is a device that converts direct current (abbreviated as "DC" hereinafter) energy supplied from a photovoltaic module into alternating current (abbreviated as "AC" hereinafter) energy and provides the converted AC current to a single-phase alternating current grid (or electric load).

Such a photovoltaic module has a positive (+) polarity and a negative (−) polarity which are connected to a photovoltaic inverter. When the positive and negative polarity cables of the photovoltaic have damages, wiring errors, or defects, dielectric breakdown and leakage currents occur.

Excessive leakage current may cause a single-phase photovoltaic inverter to be burned out and also harm a worker's body when the worker grasps the positive and negative polarity cables.

In addition, since a current transformer that is only used to measure such a leakage current is produced for a special purpose rather than a general purpose, the current transformer is very expensive and thus increases the total production cost of a power generation system.

Furthermore, a method of measuring such a leakage current has a non-insulated type. Thus, when an abnormal fault such as a ground fault or electric shortage occurs at a photovoltaic module side, a fault current or a fault voltage may be applied to a leakage current measuring unit at an input side of a single-phase photovoltaic inverter, thus burning out the high-priced current transformer that performs a precise measurement.

REFERENCE PRIOR ART DOCUMENT

Korean Allowed Patent 10-1223026

SUMMARY OF THE INVENTION

Therefore, an object of the present disclosure is to provide a single-phase photovoltaic inverter and a control method thereof in which, when a leakage current at an input terminal of the single-phase photovoltaic inverter is measured, an ordinary current transformer is used to measure the leakage current, instead of a high-priced leakage-current-dedicated current transformer or special-purpose current transformer.

Another object of the present disclosure is to provide a single-phase photovoltaic inverter and a control method thereof in which small insulated transformer is applied in order to safely protect the equipment when an abnormal fault such as a ground fault or electric shortage occurs at a photovoltaic module side.

To achieve these and other advantages and in accordance with the purpose of this disclosure, as embodied and broadly described herein, there is provided a single-phase photovoltaic inverter according to the invention that converts direct current electric power supplied from a single-phase photovoltaic module into alternating current electric power, the single-phase photovoltaic inverter comprising:

an input terminal including a first input terminal connecting to a positive polarity of the single-phase photovoltaic module and a second input terminal connecting to a negative polarity of the single-phase photovoltaic module;

an inverter unit configured to convert direct current electric power supplied through the input terminal into alternating current electric power and supply the converted alternating current electric power to a grid; and a leakage current measuring unit connected in parallel with the inverter unit and configured to measure a leakage current delivered through the input terminal.

According to one preferred aspect of the invention, the leakage current measuring unit comprises:

a first insulated transformer having one end connected with the first input terminal, and configured to amplify a leakage current flowing to a ground;

a first current transformer having one end connected with the other end of the first insulated transformer, and configured to measure the leakage current amplified by the first insulated transformer;

a second insulated transformer having one end connected with the second input terminal, and configured to amplify the leakage current flowing to the ground;

a second current transformer having one end connected with the other end of the second insulated transformer and the other end connected with the ground, and configured to measure the leakage current amplified by the second insulated transformer;

a first sensing line configured to deliver the leakage current measured by the first current transformer to a controller; and a second sensing line configured to deliver the leakage current measured by the second current transformer to the controller.

According to another preferred aspect of the invention, the first insulated transformer or the second insulated transformer is an insulated transformer having a small capacity of several voltage-amperes and is produced by winding a coil of a predetermined number N of turns, here N is a natural number.

According to still another preferred aspect of the invention, the single-phase photovoltaic inverter according to the invention further comprises a reactor, a booster switch, a diode, and a capacitor, wherein, the reactor has one end connected with the first input terminal and one end of the leakage current measuring unit, and the other end connected with the booster switch and the diode, the booster switch has one end connected with the other end of the reactor and one end of the diode, and the other end connected with the second input terminal, the other end of the leakage current measuring unit, the other end of the capacitor, and the other end of the inverter unit, the diode has one end connected with the other end of the reactor and one end of the booster switch and the other end connected with one end of the capacitor and one end of the inverter unit, and the capacitor has one end connected with the other end of the diode and one end of the inverter unit, and the other end connected with the second input terminal, the other end of the leakage current measuring unit, the other end of the booster switch, and the other end of the inverter unit.

Further scope of applicability of the present application will become more apparent from the present disclosure given hereinafter. However, it should be understood that the present disclosure and specific examples, while indicating preferred embodiments of the invention, are given by way of illustration only, since various changes and modifications within the spirit and scope of the invention will become apparent to those skilled in the art from the present disclosure.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
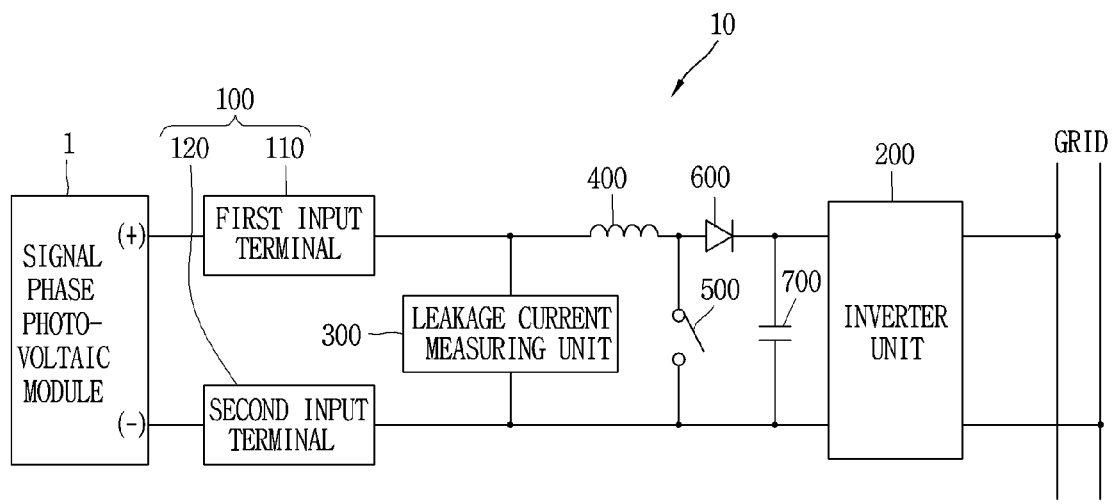
FIG. 1 is a block diagram illustrating a configuration of a single-phase photovoltaic inverter according to an embodiment of the present invention.

Hereinafter, preferred embodiments of the present invention will be described in detail with reference to the accompanying drawings, and the same or similar elements are designated with the same numeral references regardless of the numerals in the drawings and their redundant description will be omitted.

FIG. 1 is a block diagram showing a configuration of a single-phase photovoltaic inverter 10 according to an embodiment of the present invention.

As shown in FIG. 1, the single-phase photovoltaic inverter 10 comprises a input terminal 100, an inverter unit 200, a leakage current measuring unit 300, a reactor 400, a booster switch 500, a diode 600, and a capacitor 700. Not all of these elements of the single-phase photovoltaic inverter 10 are essential. Thus the single-phase photovoltaic inverter 10 may configured with elements more or fewer than those shown in FIG. 1.

As shown in FIG. 1, the input terminal 100 includes a first input terminal 110 that connects to a positive (+) polarity of a single-phase photovoltaic module 1 and a second input terminal 120 that connects to a negative (−) polarity of the single-phase photovoltaic module 1.

In addition, the input terminal 100 may comprise a plurality of input terminals.

In addition, the plurality of input terminals included in the input terminal 100 are connected in series to a plurality of photovoltaic modules, respectively.

The inverter unit 200 converts DC electric power (or DC voltage/DC current) provided (or supplied/delivered) from the single-phase photovoltaic module through the input terminal 100 into AC electric power (or AC voltage/AC current).

In addition, the inverter unit 200 provides (or supplies) the converted AC electric power to a grid (or load) (not shown).

Figure 2:
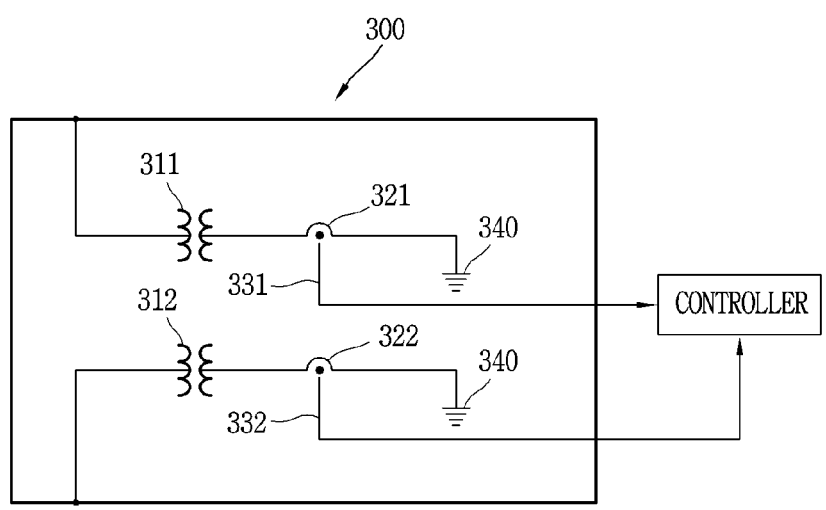
FIG. 2 is a block diagram illustrating a configuration of a leakage current measuring unit according to an embodiment of the present invention.

As shown in FIG. 2, the leakage current measuring unit 300 comprises a first insulated transformer 311, a second insulated transformer 312, a first current transformer 321, a second current transformer 322, a first sensing line 331, and a second sensing line 332. Not all of these elements of the leakage current measuring unit 300 shown in FIG. 2 are essential. Thus the leakage current measuring unit 300 may be implemented with elements more or fewer than those shown in FIG. 2.

Here, the leakage current measuring unit 300 is connected in parallel with the inverter unit 200.

In addition, one end of the leakage current measuring unit 300 is connected with the first input terminal 110, and the other end of the leakage current measuring unit 300 is connected with the second input terminal 120.

The first insulated transformer 311 has one end connected with the first input terminal 110 and the other end connected with the first current transformer 321.

In addition, the first insulated transformer 311 is an insulated transformer having a small capacity of several voltage-amperes (VA) and is produced by winding a coil of a predetermined number N of turns (N is a natural number).

In addition, the first insulated transformer 311 amplifies a leakage current (e.g., of several to several tens of mA) flowing to a ground 340 by the N times.

In this way, the first insulated transformer 311 insulates a small leakage current, and thus may be produced to have a small capacity of several VA.

In addition, the first insulated transformer 311 provides the leakage current amplified by the N times to the first current transformer 321.

The first current transformer 321 measures the leakage current amplified by the N times by the first insulated transformer 311. Here, the first current transformer 321 may be an ordinary current transformer (in other words a current transformer for general-purpose) rather than a leakage-current-dedicated current transformer or special-purpose current transformer.

In addition, the first current transformer 321 has one end connected with the first insulated transformer 311 and the other end connected with the ground 340.

The first current transformer 321 delivers the measured leakage current to a controller (reference numeral not given) through the first sensing line 331.

Here, the controller may be configured to compare the measured leakage current with a predetermined reference current. When a value of the measured leakage current is equal to or larger than the value of the predetermined reference current, the controller is configured to determine occurrence of current leakage and to output a trip control signal to a circuit breaker (not shown).

The second insulated transformer 312 has one end connected with the second input terminal 120 and the other end connected with the second current transformer 322.

In addition, the second insulated transformer 312 is an insulated transformer having a small capacity of several voltage-amperes (VA) and is produced by winding a coil of a predetermined number N of turns (N is a natural number).

In addition, the second insulated transformer 312 amplifies a leakage current (e.g., of several to several tens of mA) flowing to the ground 340 by the N times.

In this way, the second insulated transformer 312 insulates a small leakage current, and thus may be produced to have a small capacity of several VA.

In addition, the second insulated transformer 312 provides the leakage current amplified by the N times to the second current transformer 322.

The second current transformer 322 measures the leakage current amplified by the N times by the second insulated transformer 312. Here, the second current transformer 322 may be an ordinary current transformer rather than a leakage-current-dedicated current transformer or special-purpose current transformer.

In addition, the second current transformer 322 has one end connected with the second insulated transformer 312 and the other end connected with the ground 340.

The second current transformer 322 delivers the measured leakage current to the controller through the second sensing line 332.

In this way, the first insulated transformer 311 and the second insulated transformer 312 is produced (or formed/configured) by winding a coil of a predetermined number N of turns to amplify a small leakage current (e.g., of several to several tens of mA) by the N times, thus enabling measurement of the leakage current even though the first current transformer 321 and the second transformer 322 are only ordinary general purpose current transformers.

Furthermore, the measurement is performed on the first insulated transformer 311 and the second insulated transformer 132 in the electrically insulated configuration in which a first winding and a second winding are separated with each other to insulated from each other, thus preventing the leakage current measuring unit 300 of the single-phase photovoltaic inverter 10 from being burned out due to current or voltage caused by an abnormal fault such as a ground fault or electric shortage occurring in the photovoltaic module.

The reactor 400 has one end connected with the first input terminal 110 and one end of the leakage current measuring unit 300, and the other end connected with the booster switch 500 and the diode 600.

In addition, the reactor 400 is connected in series to the input terminal 100 (or the first input terminal 110).

The booster switch 500 has one end connected with the other end of the reactor 400 and one end of the diode 600, and the other end connected with the second input terminal 120, the other end of the leakage current measuring unit 300, the other end of the capacitor 700, and the other end of the inverter unit 200.

In addition, the booster switch 500 is connected in parallel with the inverter unit 200 and the leakage current measuring unit 300.

The diode 600 has one end connected with the other end of the reactor 400 and one end of the booster switch 500, and the other end connected with one end of the capacitor 700 and one end of the inverter unit 200.

In addition, the diode 600 is connected in series to the reactor 400 and connected in parallel with the booster switch 500.

The capacitor 700 has one end connected with the other end of the diode 600 and one end of the inverter unit 200, and the other end connected with the second input terminal 120, the other end of the leakage current measuring unit 300, the other end of the booster switch 500, and the other end of the inverter unit 200.

In addition, the capacitor 700 is connected in parallel with the booster switch 500.

In addition, the booster switch 500, the diode 600, and the capacitor 700 form one booster circuit section.

The booster unit boosts (in other words transform a voltage into higher voltage) a voltage measured by the leakage current measuring unit 300.

In an embodiment of the present invention, the single-phase photovoltaic inverter has been described as an example. However, embodiments of the present invention are not limited thereto and may be applied to multi-phases photovoltaic inverters.

According to an embodiment of the present invention, as described above, it is possible to reduce the production cost of a photovoltaic system by using an ordinary current transformer, instead of a high-priced leakage-current-dedicated current transformer or special-purpose current transformer, to measure a leakage current at an input terminal of a single-phase photovoltaic inverter.

In addition, according to an embodiment of the present invention, as described above, it is also possible to protect the leakage current measuring unit when an abnormal fault occurs by applying a small insulated transformer in order to safely protect the equipment (the photovoltaic system) when an abnormal fault such as a ground fault or electric shortage occurs at a photovoltaic module side.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A single-phase photovoltaic inverter that converts direct current electric power supplied from a single-phase photovoltaic module into alternating current electric power, the single-phase photovoltaic inverter comprising:
    an input terminal including a first input terminal connecting to a positive polarity of the single-phase photovoltaic module and a second input terminal connecting to a negative polarity of the single-phase photovoltaic module;
    an inverter unit configured to convert direct current electric power supplied through the input terminal into alternating current electric power and supply the converted alternating current electric power to a grid; and
    a leakage current measuring unit connected in parallel with the inverter unit and configured to measure a leakage current delivered through the input terminal,
    wherein the leakage current measuring unit comprises:
    a first insulated transformer having one end connected with the first input terminal, and configured to amplify a leakage current flowing to a ground;
    a first current transformer having one end connected with the other end of the first insulated transformer and having the other end connected with the ground, and configured to measure the leakage current amplified by the first insulated transformer;
    a second insulated transformer having one end connected with the second input terminal, and configured to amplify the leakage current flowing to the ground;
    a second current transformer having one end connected with the other end of the second insulated transformer and the other end connected with the ground, and configured to measure the leakage current amplified by the second insulated transformer;
    a first sensing line configured to deliver the leakage current measured by the first current transformer to a controller; and
    a second sensing line configured to deliver the leakage current measured by the second current transformer to the controller.

2. The single-phase photovoltaic inverter of claim 1, wherein the first insulated transformer or the second insulated transformer is an insulated transformer having a small capacity of several voltage-amperes and is produced by winding a coil of a predetermined number N of turns, here N is a natural number.

3. The single-phase photovoltaic inverter of claim 1, further comprising a reactor, a booster switch, a diode, and a capacitor, wherein, the reactor has one end connected with the first input terminal and one end of the leakage current measuring unit, and the other end connected with the booster switch and the diode, the booster switch has one end connected with the other end of the reactor and one end of the diode, and the other end connected with the second input terminal, the other end of the leakage current measuring unit, the other end of the capacitor, and the other end of the inverter unit, the diode has one end connected with the other end of the reactor and one end of the booster switch and the other end connected with one end of the capacitor and one end of the inverter unit, and the capacitor has one end connected with the other end of the diode and one end of the inverter unit, and the other end connected with the second input terminal, the other end of the leakage current measuring unit, the other end of the booster switch, and the other end of the inverter unit.

\* \* \* \* \*